(12) United States Patent
Schmidt et al.

(10) Patent No.: US 10,871,770 B2
(45) Date of Patent: Dec. 22, 2020

(54) SYSTEM, IN PARTICULAR A MANUFACTURING SYSTEM

(71) Applicant: SEW-EURODRIVE GMBH & CO. KG, Bruchsal (DE)

(72) Inventors: Josef Schmidt, Graben-Neudorf (DE); Maja Sliskovic, Ettlingen (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 311 days.

(21) Appl. No.: 14/761,809

(22) PCT Filed: Jan. 10, 2014

(86) PCT No.: PCT/EP2014/000044
§ 371 (c)(1),
(2) Date: Oct. 29, 2015

(87) PCT Pub. No.: WO2014/111242
PCT Pub. Date: Jul. 24, 2014

(65) Prior Publication Data
US 2016/0048128 A1    Feb. 18, 2016

(30) Foreign Application Priority Data
Jan. 21, 2013 (DE) .................... 10 2013 000 851

(51) Int. Cl.
*G05B 19/418* (2006.01)
*G05D 1/00* (2006.01)
*G05D 1/02* (2020.01)

(52) U.S. Cl.
CPC ..... *G05B 19/41895* (2013.01); *G05D 1/0055* (2013.01); *G05B 2219/50193* (2013.01);
(Continued)

(58) Field of Classification Search
CPC .... G05B 19/41895; G05B 2219/50393; G05B 2219/50193; G05D 1/0055; G05D 1/0278; Y02P 90/60; Y02P 90/285
(Continued)

(56) References Cited

U.S. PATENT DOCUMENTS

| 7,652,238 B2 | 1/2010 | Haberer et al. |
| 2006/0100783 A1* | 5/2006 | Haberer .............. G05D 1/024 701/301 |
| 2010/0214085 A1* | 8/2010 | Avery .................. G08G 1/161 340/435 |

FOREIGN PATENT DOCUMENTS

| BE | 906044 A2 | 6/1987 |
| CN | 102096803 A | 6/2011 |

(Continued)

OTHER PUBLICATIONS

International Search Report, dated Nov. 19, 2014, issued in corresponding International Application No. PCT/EP2014/000044.
(Continued)

*Primary Examiner* — Brian P Sweeney
(74) *Attorney, Agent, or Firm* — Carter DeLuca & Farrell LLP

(57) ABSTRACT

A system, in particular a manufacturing system, the system including machines, especially stationary and mobile machines, and at least one vehicle and a control, the vehicle having at least one sensor for ascertaining the relative position of a person, in particular a sensor for ascertaining the distance between the vehicle and the person, and for ascertaining the angle between the driving direction of the vehicle and the connecting line between the person and the vehicle, the vehicle having a position acquisition means for sensing the position of the vehicle, in particular a GPS system or a triangulation system for ascertaining the position of the vehicle, the control including a means for ascertaining the safety zone around the person and the machines situated therein, a data transmission channel being provided between the control and the machines.

24 Claims, 3 Drawing Sheets

(52) U.S. Cl.
CPC . *G05B 2219/50393* (2013.01); *G05D 1/0278* (2013.01); *Y02P 90/02* (2015.11); *Y02P 90/60* (2015.11)

(58) Field of Classification Search
USPC .......................................................... 701/301
See application file for complete search history.

(56) References Cited

FOREIGN PATENT DOCUMENTS

| | | |
|---|---|---|
| CN | 102651173 A | 8/2012 |
| DE | 10 2004 008 614 A1 | 9/2005 |
| DE | 10 2004 043 515 | 3/2006 |
| DE | 10 2008 017 129 A1 | 10/2009 |
| DE | 10 2011 076 466 A1 | 11/2012 |

OTHER PUBLICATIONS

International Preliminary Report on Patentability, dated Jul. 30, 2015, issued in corresponding International Application No. PCT/EP2014/000044.

\* cited by examiner

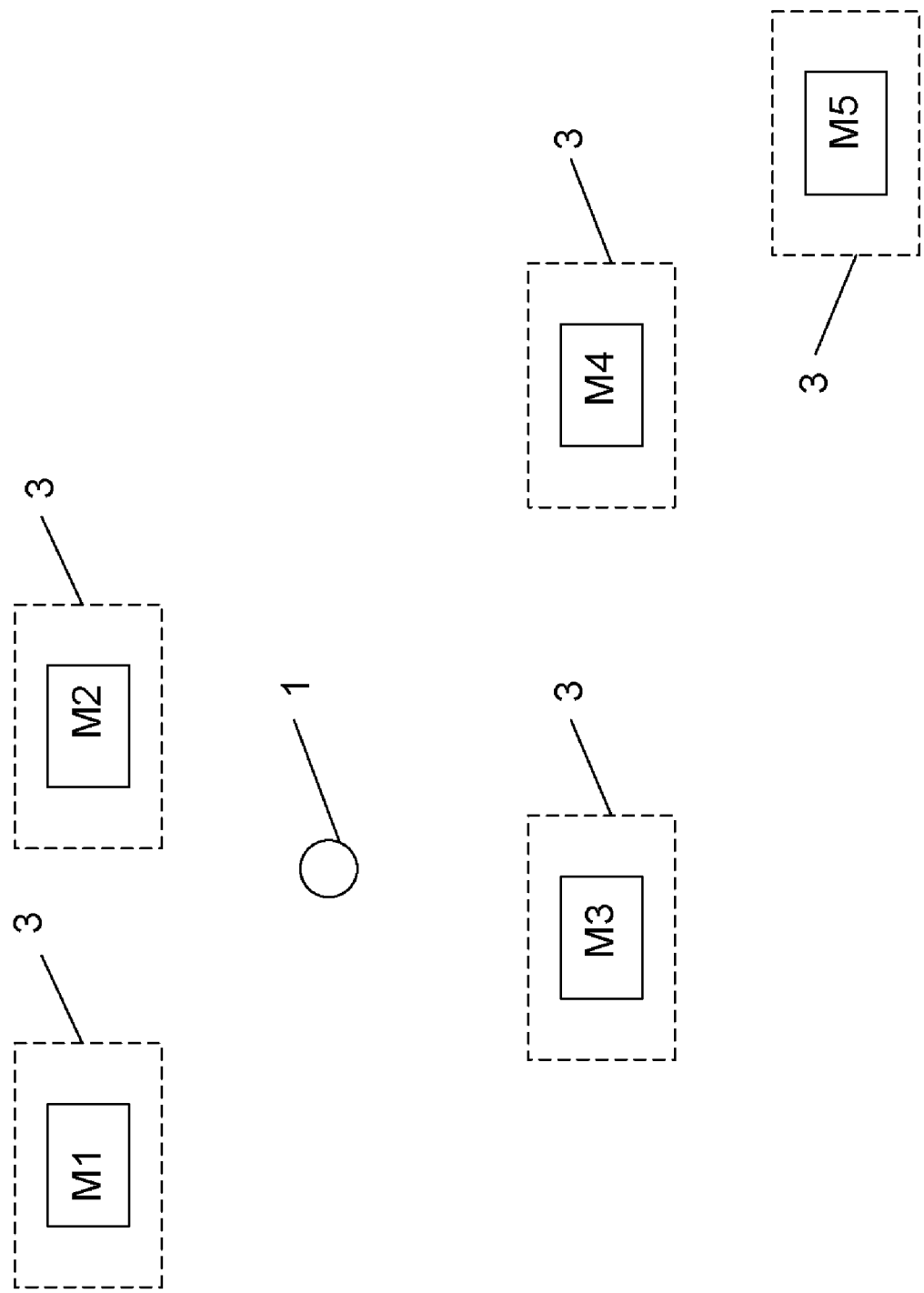

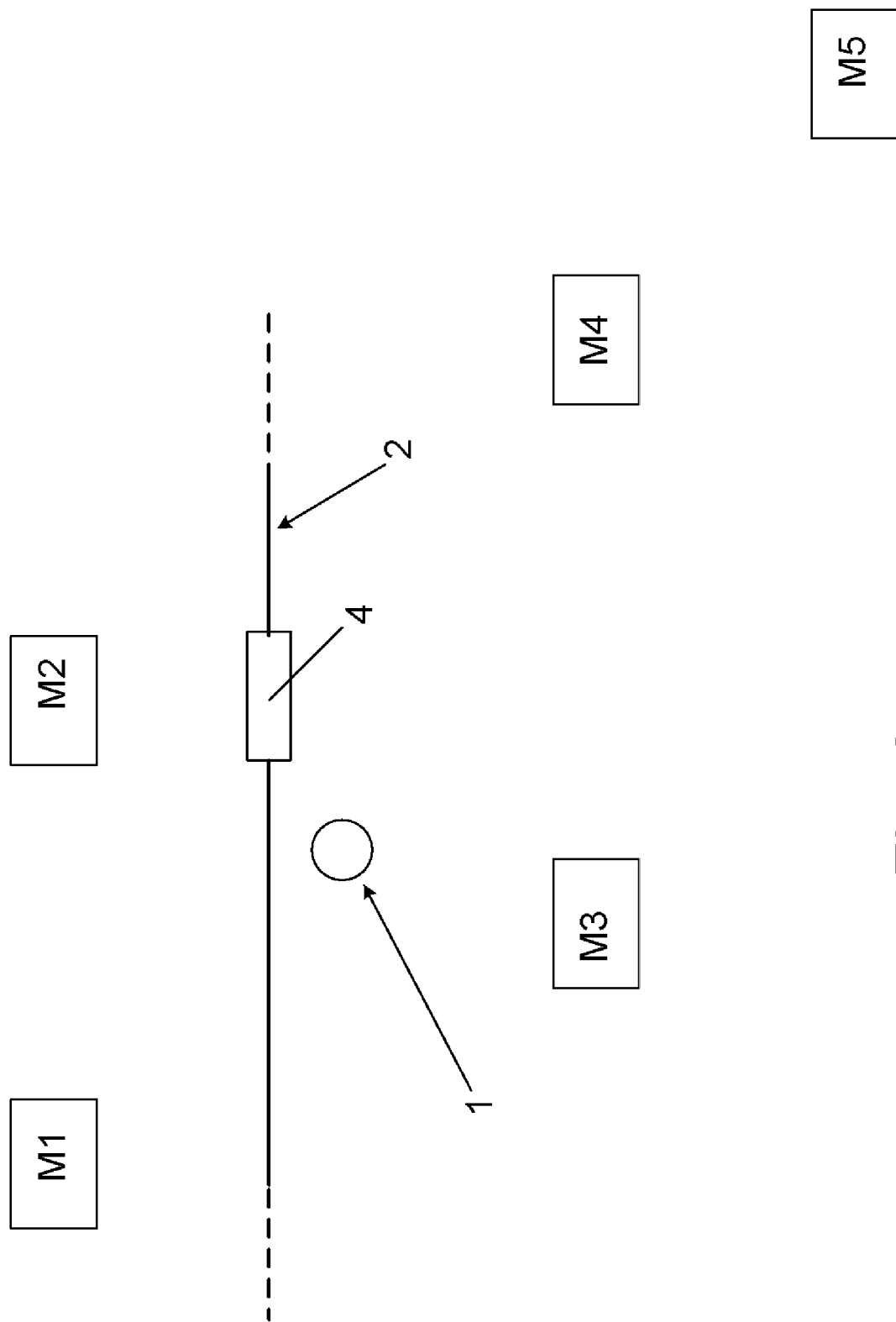

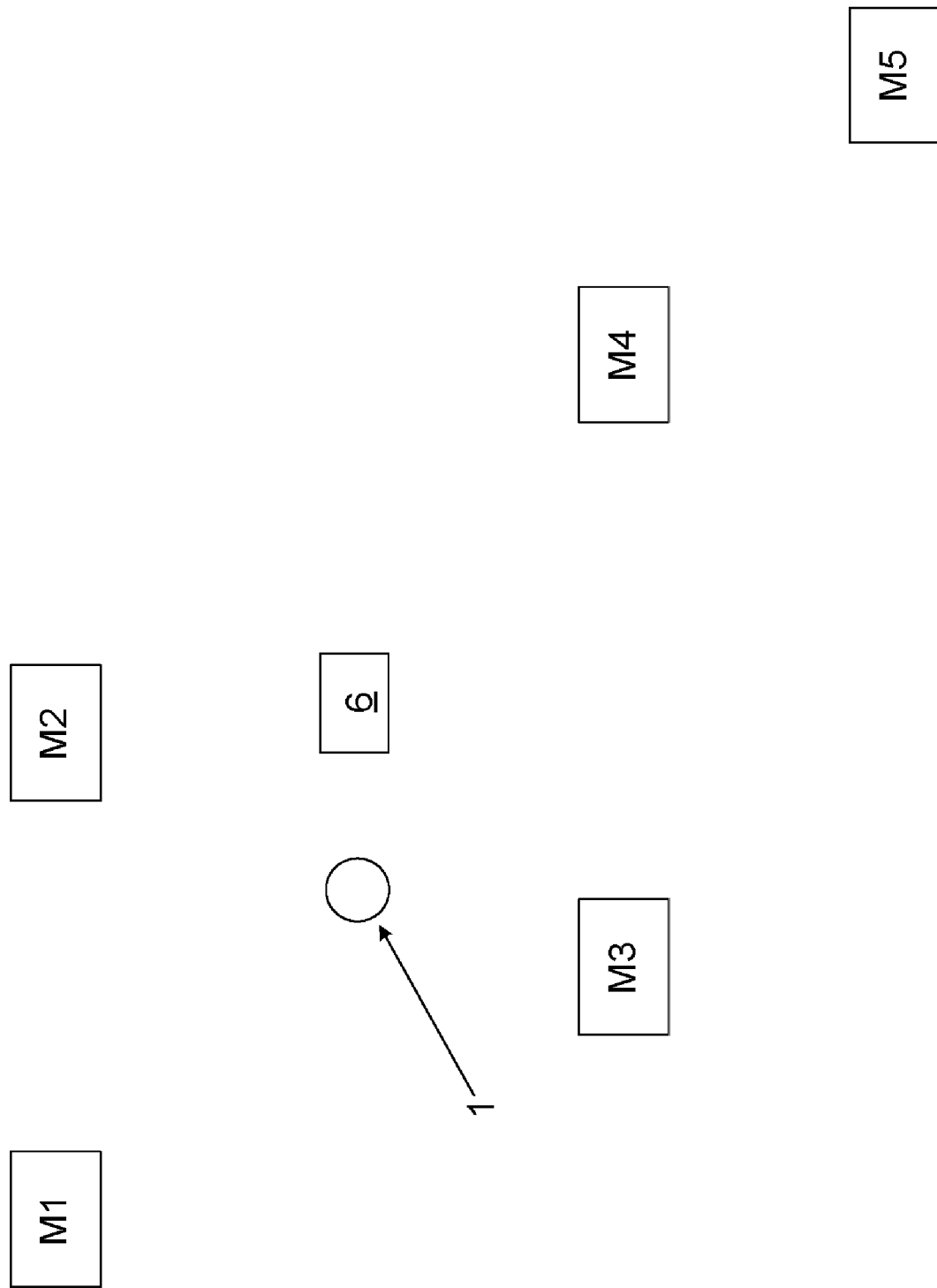

SYSTEM, IN PARTICULAR A MANUFACTURING SYSTEM

FIELD OF THE INVENTION

The present invention relates to a system, especially a manufacturing system.

It is common knowledge that a system, in particular a manufacturing system, includes machinery that poses a danger to people. For this reason these machines are provided in cages, i.e., gitter boxes or similar devices.

SUMMARY

Therefore, the present invention is based on the objective of further refining a system without safety cages for machines, such as robots or the like.

Features of the system include that the system, in particular the manufacturing system, includes machines, especially stationary or mobile machines, and at least one vehicle and a control,
the vehicle including at least one sensor for ascertaining the relative position of a person, in particular a sensor for ascertaining the distance between the vehicle and the person and for ascertaining the angle between the driving direction of the vehicle and the connecting line between the person and the vehicle, the vehicle having a position acquisition means for sensing the position of the vehicle, especially a GPS system or a triangulation system for ascertaining the position of the vehicle, the control including means for ascertaining the safety zone around the person and the machines located therein, a data transmission channel being provided between the control and the machines.

This has the advantage that no cage barriers or gitter boxes are required and the machines are directly accessible from as many sides as possible, so that more effective logistical methods are able to be used. In addition, the safety only in the safety zone around the person is achieved by putting only the particular machines that are located in this area into the safety-directed state. As soon as the person has moved on, the imaginary safety zone moves along as well and thereby allows an immediate release of the machines that leave the safety zone.

In one advantageous development, the vehicle is guided on rails, the rail in particular extending above the path provided for persons, or the vehicle is maneuverable in a planar manner. This has the advantage that the most uninterrupted and simple tracking of the person is able to be implemented by the vehicle.

In one advantageous development, the vehicle has a loudspeaker and a multitude of microphones, especially a microphone array and/or an acoustic camera, the vehicle in particular including a means for ascertaining a control signal for the loudspeaker, so that noise is suppressed at the position of the person, in particular at the position of the person's ears. This has the advantage of not only increasing the safety, but also of enabling a noise suppression for the person.

In one advantageous development, the vehicle is equipped with a daylight camera, an infrared camera, a microphone, and/or a multitude of microphones, in particular a camera or microphone array; in addition, an evaluation unit for the sensor signals for ascertaining the position of a person is situated on the vehicle. This is advantageous insofar as the person is able to be detected in a simple manner, so that a rapid determination can be made.

Features of the method for operating a system include that the system includes machines, especially stationary or mobile machines, and at least one vehicle and a control, the position of a person being determined from the direction of the vehicle, and the particular machines that are located within a safety zone around the person are put into a safety-directed state.

This has the advantage of increased safety without requiring cages or gitter boxes or enclosures.

In one advantageous development, the speed of a machine axle is reduced in the machine which is put into the safety-directed state, the machine axle in particular being the axle of a drive wheel, especially a traction drive wheel, of the machine. This has the advantage that the speed is able to be lowered to such an extent that the danger to the person is reduced.

In one advantageous development, the speed of the machine axles is reduced further if the person is detected by a sensor of the particular machine. This has the advantage of further increasing the safety. The safety in a traction drive, in particular, is increased in such a way that driving into the person, and thus a collision with said person, is able to be prevented.

In one advantageous development, the speed, especially the traction speed, of a non-stationary machine is reduced in such a way that the braking distance is shorter than the distance to the person. This is advantageous insofar as a safe stop may be implemented in a timely manner.

In one advantageous development, the vehicle is actuated in such a way that the distance to the person is kept essentially constant or that the distance is at least regulated to a minimum distance value. This has the advantage that the vehicle follows the person and a position of the person is therefore able to be detected with the fewest errors possible.

In one advantageous development, the vehicle has a multitude of microphones, so that the position of noise sources is ascertained and an actuation signal for a loudspeaker of the vehicle is generated therefrom, in such a way that the noise that is generated by noise sources and reaches the ears of the person is reduced, so that a noise suppression is induced by the vehicle. This is advantageous insofar as a noise reduction is achievable for the person by phase-dependent superimpositioning, especially in the otherwise fully-automatically operated manufacturing system.

In one advantageous development, the vehicle is equipped with a daylight camera, an infrared camera, a microphone, and/or a multitude of microphones, in particular an acoustic camera or microphone array, for ascertaining the position of a person. This is advantageous insofar as it allows the use of simple ascertainment means.

Further advantages are derived from the dependent claims. The present invention is not restricted to the feature combination of the claims. Those skilled in the art will discover additional meaningful combination possibilities of claims and/or individual claim features and/or features of the specification and/or of the figures, that arise from the stated objective and/or the objective resulting from a comparison with the related art, in particular.

BRIEF DESCRIPTION OF THE DRAWINGS

FIG. 1 schematically shows a manufacturing system according to the related art;

FIG. 2 shows a manufacturing system according to the present invention, including a rail-bound vehicle 4.

FIG. 3 shows another manufacturing system according to the present invention, which includes a vehicle 6 which is maneuverable on a maneuvering surface.

DETAILED DESCRIPTION

As illustrated in FIG. 1, it is known to place machines (M1, M2, M3, M4, M5) inside a cage, in particular a gitter box, in an effort to provide safety for person 1.

Among such machines are not only machine tools but robots as well.

When a door of cage 3, especially the gitter box, is opened, the corresponding machine situated inside cage 3 is switched off or put into another safe state. For example, the lowering of the speeds of machine axles or robot axles is known as a safe state.

In contrast to the related art, the system according to the present invention as illustrated in FIG. 2 or 3 dispenses with cages 3.

As a result, a person 1 is able to move freely through the system, approach the machines (M1, M2, M3, M4, M5) at will, and touch them, in particular.

To make it safe, the corresponding machine located within a safety zone around person 1 is switched off or put into another safe state. The lowering of the speeds of machine axles or robot axles, for example, is also known as a safe state.

Sensors, especially a daylight camera, infrared camera, microphone and/or a microphone array, are used for detecting person 1. Person 1 is detected by analyzing the signals generated by the sensors, in particular by an image recognition system.

Since the position of the sensors is known, the position of person 1 is ascertainable as well. Thus, the position is forwarded via a data transmission channel, so that the particular machines that drop below a minimum distance can then be put into the safe state.

In a first exemplary embodiment, the sensors are stationary and situated on the ceiling of the manufacturing plant or on a T-beam of the building, for instance, so that a large sensitive region of the sensors is able to be obtained.

In one further exemplary embodiment, the sensors are situated on a rail-bound vehicle 4, which is movable along a rail 2, as illustrated in FIG. 2.

In one further exemplary embodiment, the sensors are situated on a vehicle 6, which is movable along a maneuvering surface, as illustrated in FIG. 3.

When non-stationary sensors are used, i.e., sensors situated on vehicle 6 or rail vehicle 4 according to FIG. 2 or 3, the vehicle (4, 6) is able to be brought as close to person 1 as possible while maintaining a minimum distance. This makes it possible to achieve very low interference susceptibility and/or error rates.

Because access to the machines (M1, M2, M3, M4, M5) is unrestricted, even unmanned transport systems, i.e., FTS, and/or AGV, i.e., an automated guided vehicle, can be moved toward the individual machine (M1, M2, M3, M4, M5) from every direction. The paths are consequently less restricted than in the related art according to FIG. 1.

More effective logistical sequences within the manufacturing system can therefore be set up.

Objects are brought to each of the machines (M1, M2, M3, M4, M5) and objects are fetched again after processing by the individual machine (M1, M2, M3, M4, M5).

The vehicle (4, 6) is equipped with a control, which is connected to the sensors and/or their associated evaluation means. In addition, the control is developed as a bus node, as are the machines (M1, M2, M3, M4, M5) by way of their controls. An evaluation means also includes an image evaluation unit for detecting a person 1 or other movable objects.

Since the control of the vehicle has stored a list of the positions of the machines (M1, M2, M3, M4, M5) of the manufacturing system in its memory, the machines (M1, M2, M3, M4, M5) located in the safety zone are ascertained by the control, whereupon they receive, via the data transmission channel implemented as a data bus, a corresponding command which puts them into the safety-directed state.

As an alternative, only the position of person 1 is ascertained, and the controls of the machines (M1, M2, M3, M4, M5) then determine on their own whether they are located within the safety zone and must therefore be brought into the safety-directed state.

If person 1 continues to move, the vehicle (4, 6) follows person 1, so that the detection of the person remains essentially constant even if the movement continues. The detected position of the person is updated in a recurring manner, so that machines (M1, M2, M3, M4, M5) situated in the updated safety zone are transferred into the safety-directed state, and the machines (M1, M2, M3, M4, M5) located outside the safety zone are released to assume their predefined working states.

The vehicle (4, 6) has a position detection system, which is realizable either with the aid of markings situated in the manufacturing system, or by a GPS system. Transmitters, whose position is known to the control of the vehicle (4, 6), are preferably disposed in the manufacturing system. The vehicle then ascertains its position with the aid of the signals received from the transmitters, using the phase relation of the transmitters, in particular. After the position of the vehicle (4, 6) has been determined, the control of the vehicle (4, 6) ascertains the position of person 1. This position of the person is either transmitted to the machines (M1, M2, M3, M4, M5) by way of the data transmission channel, or a safety zone around the position of person 1 is first determined and the command to assume the safety-directed state is then transmitted to the machines (M1, M2, M3, M4, M5) that are located inside this safety zone via the data transmission channel.

A reduction of all speeds of the machine axles is provided as the individual safety-directed state of one of the machines (M1, M2, M3, M4, M5). Moreover, each machine (M1, M2, M3, M4, M5) additionally has at least one sensor, which further reduces the speed of a machine axle that may pose a risk to person 1 after person 1 or parts thereof has/have been detected. In the case of machines (M1, M2, M3, M4, M5) that are not stationary, such as further AGVs or FTSs, the speed is reduced when the safety zone is entered, and if a sensor of the non-stationary machine (M1, M2, M3, M4, M5) detects person 1, a further reduction of the speed takes place. The speed is reduced to a value at which the brake travel is shorter than the minimum distance from person 1.

The data transmission via the data transmission channel may be carried out either directly from the vehicle to the machines (M1, M2, M3, M4, M5) or indirectly by way of a central control. This central control then specifies the speeds of the machines (M1, M2, M3, M4, M5) or the vehicles that are not stationary.

In one development according to FIG. 2, i.e., which includes a rail-guided vehicle 4, rail 2 is preferably situated above the path provided for person 1.

In other words, the clearance between the vehicle (4, 6) and person 1 preferably is kept essentially constant.

In addition, the vehicle (4, 6) is equipped with a microphone array, i.e., a multitude of microphones, especially at least three microphones. An analysis of the received signals thus makes it possible to ascertain noise sources and their distance. Additionally, a loudspeaker, which is actuated as a function of the received signals, is situated on top of the vehicle (4, 6). The signal generated by the loudspeaker is ascertained in such a way that at the position of the ears of person 1, the superimpositioning of the noise that is emitted by the noise sources and reaches the ears of person 1 and the noise generated by the loudspeaker has the smallest amplitude possible. This makes it possible to achieve a suppression of noise sources for the person, especially of determinable noise sources, for which spectral subtraction is preferably used.

In one further exemplary embodiment according to the invention, the control is stationary, and the vehicle transmits only the ascertained positional data of the person. The stationary control then determines the safety zone and transmits the commands for the transition to the safety-directed state to the corresponding machines (M1, M2, M3, M4, M5).

List of Reference Numerals 1 person
2 rail
3 cage, in particular a gitter box
4 rail vehicle
6 vehicle
M1 machine
M2 machine
M3 machine
M4 machine
M5 machine

The invention claimed is:

1. A system, comprising:
a plurality of machines;
at least one vehicle;
a control device; and
a data transmission channel provided between the control device and the machines, wherein;
the vehicle has at least one sensor for ascertaining a relative position of a person,
the vehicle has a position acquisition arrangement for sensing a position of the vehicle, and
the control device is adapted to ascertain a safety zone area around the person and the machines situated therein based on the ascertained relative position of the person and the sensed position of the vehicle and to place the machines situated in the safety zone into a safety-directed state.

2. The system as recited in claim 1, wherein:
the system is a manufacturing system.

3. The system as recited in claim 1, wherein:
the machines include one of stationary machines and mobile machines.

4. The system as recited in claim 1, wherein:
the sensor ascertains a distance between the vehicle and the person, and ascertains an angle between a driving direction of the vehicle and a connecting line between the person and the vehicle.

5. The system as recited in claim 1, wherein the arrangement for sensing the position of the vehicle includes one of a GPS system and a triangulation system for ascertaining the position of the vehicle.

6. The system as recited in claim 1, wherein one of:
the vehicle is guided on rails extending above a path provided for persons, and
the vehicle is able to travel in a planar manner.

7. The system as recited in claim 1, wherein:
the vehicle is equipped with a loudspeaker and a plurality of microphones.

8. The system as recited in claim 7, wherein:
the plurality of microphones includes at least one of a microphone array and an acoustic camera, and
the loudspeaker is controllable so that noise is suppressed at the position of the person.

9. The system as recited in claim 8, wherein the position of the person corresponds to a position of the ears of the person.

10. The system as recited in claim 1, wherein the vehicle has:
a daylight camera,
an infrared camera,
at least one microphone, and
an evaluation unit adapted to ascertain the position of a person based on at least one sensor signal.

11. The system as recited in claim 10, wherein the at least one microphone includes one of an acoustic camera and a microphone array.

12. The system as recited in claim 1, wherein the vehicle includes the control device.

13. A method for operating a system that includes machines, at least one vehicle, and a control device, the method comprising:
determining a position of a person from a direction of the vehicle; and
putting the particular machines located within a safety zone around the person into a safety-directed state, in response to a command transmitted by the control device to the particular machines located within the safety zone;
wherein the system further includes a data transmission channel provided between the control device and the machines, wherein:
the vehicle has at least one sensor for ascertaining a relative position of a person,
the vehicle has a position acquisition arrangement for sensing a position of the vehicle, and
the control device is adapted to ascertain a safety zone area around the person and the machines situated therein.

14. The method as recited in claim 13, wherein the machines include stationary machines and mobile machines.

15. The method as recited in claim 13, wherein:
in a machine which is put into the safety-directed state, a speed of a machine axle of the machine is reduced.

16. The method as recited in claim 15, wherein:
the machine axle is an axle of a drive wheel of the machine, and
the drive wheel is a traction drive wheel.

17. The method as recited in claim 15, wherein:
when the person is detected by a sensor of the machine, the speed of the machine axle is reduced further.

18. The method as recited in claim 13, further comprising:
reducing a speed of a non-stationary machine in such a way that a brake travel is shorter than a distance to the person.

19. The method as recited in claim 18, wherein the speed of the non-stationary machine includes a traction speed.

20. The method as recited in claim 13, further comprising:
actuating the vehicle in such a way that one of:
a distance to the person is kept constant, and
the distance is at least regulated to a minimum distance value.

21. The method as recited in claim 13, wherein:
the vehicle is equipped with a plurality of microphones, so that a position of a noise source is ascertained and an actuation signal for a loudspeaker of the vehicle is generated therefrom in such a way that a noise generated by the noise source and reaching the ears of the person ears is reduced in a region of the ears of the person, so that a noise suppression is induced by the vehicle.

22. The method as recited in claim 13, wherein:
the vehicle has at least one of a daylight camera, an infrared camera, and at least one microphone for ascertaining the position of the person.

23. The method as recited in claim 22, wherein the microphone includes one of an acoustic camera and a microphone array.

24. The method as recited in claim 13, wherein the vehicle includes the control device.

\* \* \* \* \*